US008402532B2

(12) United States Patent
Downen et al.

(10) Patent No.: US 8,402,532 B2
(45) Date of Patent: Mar. 19, 2013

(54) HOST CONTROL OF PARTIAL TRUST ACCESSIBILITY

(75) Inventors: Michael D. Downen, Sammamish, WA (US); Raja Krishnaswamy, Redmond, WA (US); Charles William Kaufman, Sammamish, WA (US); James S. Miller, Bellevue, WA (US); Stephen Fisher, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 11/801,714

(22) Filed: May 10, 2007

(65) Prior Publication Data
US 2008/0282315 A1  Nov. 13, 2008

(51) Int. Cl.
G06F 12/14 (2006.01)
G06F 7/04 (2006.01)
G06F 11/30 (2006.01)
G06F 9/44 (2006.01)
H04L 29/06 (2006.01)

(52) U.S. Cl. ............... 726/17; 726/22; 726/27; 713/161; 713/165; 713/187; 717/120; 717/127; 717/163

(58) Field of Classification Search ............... 726/17, 726/22, 27; 713/161, 165, 187; 717/120, 717/127, 163
See application file for complete search history.

(56) References Cited

U.S. PATENT DOCUMENTS
6,044,467 A   3/2000  Gong
7,131,143 B1  10/2006 LaMacchia et al.
2003/0041267 A1*  2/2003  Fee et al. .................... 713/201
2005/0010804 A1   1/2005  Bruening et al.
2005/0172133 A1   8/2005  Brumme et al.
2005/0172286 A1*  8/2005  Brumme et al. ................. 718/1
2006/0085460 A1   4/2006  Peschel-Gallee et al.
2006/0101407 A1   5/2006  Massarenti et al.
2006/0212400 A1*  9/2006  Kamperman et al. ......... 705/51
2006/0259763 A1  11/2006  Cooperstein et al.
2007/0011451 A1   1/2007  Botzum et al.
2007/0011723 A1   1/2007  Chao
2008/0047015 A1*  2/2008  Cornwall et al. ............... 726/25

OTHER PUBLICATIONS

"Beyond the Sandbox: Signed Code and Java 2", Date: 1999, http://www.securingjava.com/chapter-three/chaptor-three-4.html.
"Using Libraries from Partially Trusted Code", Date: 2007, http://msdn2.microsoft.com/en-us/library/8skskf63(VS.80).aspx.
Xu, et al., "Satem: Trusted Service Code Execution across Transactions", http://www.cs.rutgers.edu/~iftode/satem06.pdf, 2006.

* cited by examiner

Primary Examiner — Aravind Moorthy

(57) ABSTRACT

Various technologies and techniques are disclosed for providing host control of partial trust accessibility. A framework allows libraries to be identified as partial trust callers allowed to indicate that the libraries are allowed to be called from partially trusted code by default. The framework allows libraries to be identified as partial trust callers enabled to indicate the libraries could be called from partially trusted code, but not by default. A hosting application is notified that a particular library has been loaded. If the particular library has been identified as partial trust callers allowed, then a determination is received from the hosting application on whether to remove or keep partial trust accessibility for the particular library. If the particular library has been identified as partial trust callers enabled, then a determination is received from the hosting application on whether or not to enable partial trust accessibility for the particular library.

20 Claims, 5 Drawing Sheets

HOST CONTROL OF PARTIAL TRUST ACCESSIBILITY

BACKGROUND

Framework environments can serve as platforms for allowing software to be written and/or executed. Examples of framework environments include MICROSOFT® .NET Framework, Java Virtual Machine, and others. These frameworks are composed of individual libraries. It is not always desirable to allow software libraries to be executed from all types of environments. For example, it is sometimes undesirable to allow certain libraries to execute if they have not been tested for execution in reduced security zones where there is only partial trust. An administrator typically determines which applications are granted the right to use which software libraries in the frameworks. One problem can arise when hosting applications such as database engines, web servers, or web browsers are running a particular application. In these scenarios, the administrator setting may or may not be appropriate.

SUMMARY

Various technologies and techniques are disclosed for providing host control of partial trust accessibility. A framework allows libraries to be identified as "partial trust callers allowed" to indicate that the libraries are allowed to be called from partially trusted code by default. The framework allows libraries to be identified as "partial trust callers enabled" to indicate that the libraries could be called from partially trusted code, but not by default. A hosting application is notified that a particular library has been loaded. In one implementation, this notification is made by a callback. In another implementation, this notification is made when the particular library enters the table of loaded libraries.

If the particular library has been identified as partial trust callers allowed, then a determination is received from the hosting application on whether to remove or keep partial trust accessibility for the particular library. If the particular library has been identified as partial trust callers enabled, then a determination is received from the hosting application on whether or not to enable partial trust accessibility for the particular library. Depending on the determination made by the hosting application, the partial trust accessibility is then adjusted accordingly to either make the particular library accessible or inaccessible to partially trusted code.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
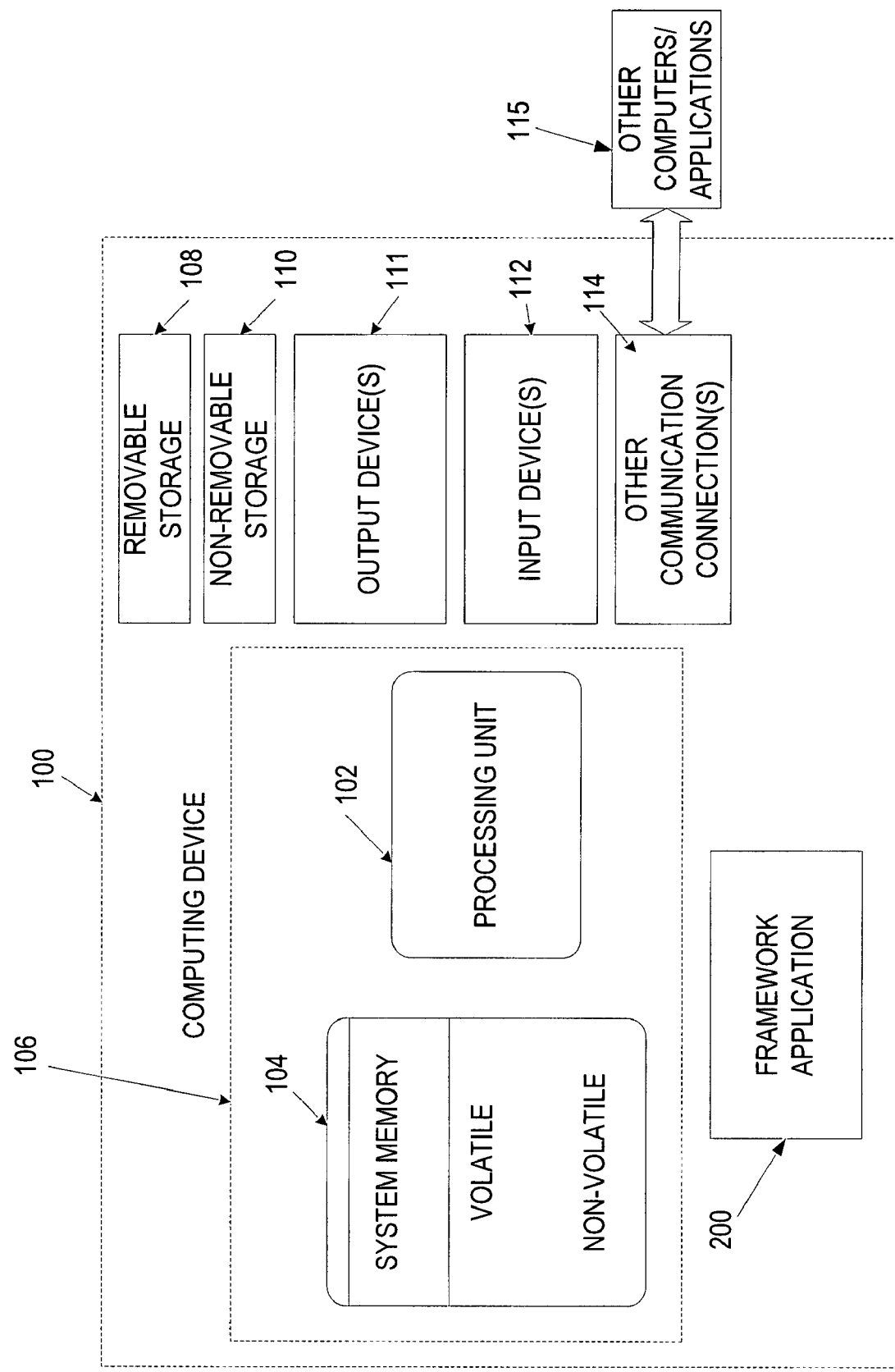
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a framework or other system that allows a hosting application to have some control over partial trust accessibility, but the system also serves other purposes in addition to these. In one implementation, one or more of the techniques described herein can be implemented as features within a framework program such as MICROSOFT® .NET Framework, or from any other type of program or service that serves as a platform for developing and/or executing software applications.

In one implementation, a framework is provided that allows a hosting application to have control over partial trust accessibility for libraries (e.g. assemblies) operating in the environment. The term "partial trust accessible" as used herein means that partially trusted code is able to access a particular library because it has been made accessible. In one implementation, partially trusted code is able to access a particular library by calling the public entry points of the particular library. Partially trusted code means code that runs in a reduced security context, such as in an Internet zone. The framework provides attributes or other identifiers that can be used to mark or otherwise identify which libraries are "partial trust callers allowed" (partial trust accessibility turned on by default) or "partial trust callers enabled" (partial trust accessibility can be enabled if appropriate). When a particular library is loaded, a hosting application is notified is the library is either partial trust callers allowed or partial trust callers enabled. The hosting application can then decide whether to revoke partial trust accessibility or to allow it, thereby determining whether or not the library is accessible from partially trusted code (such as in an Internet zone).

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes Framework application 200. Framework application 200 will be described in further detail in FIG. 2.

Figure 2:
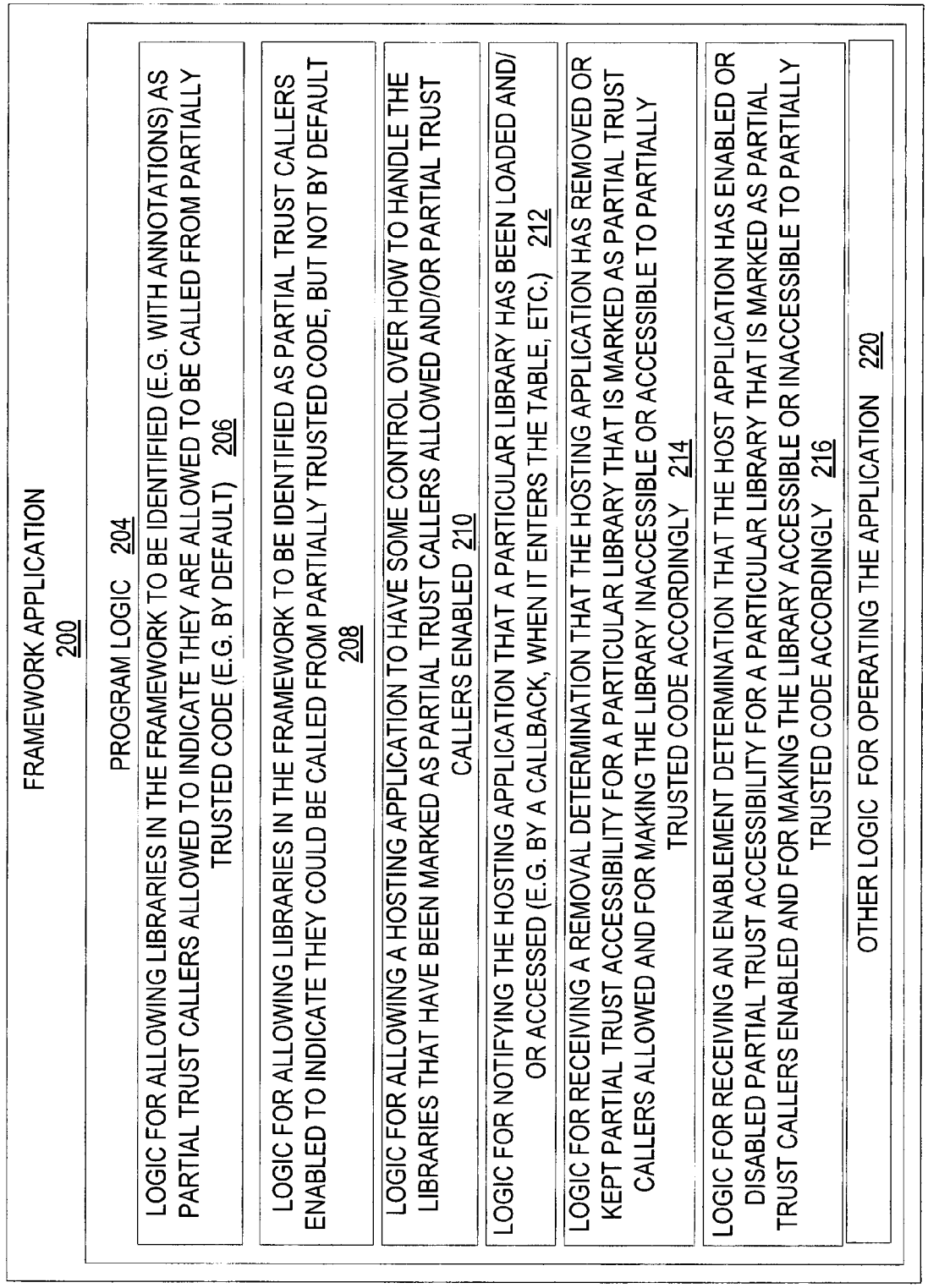
FIG. 2 is a diagrammatic view of a framework application of one implementation operating on the computer system of FIG. 1.

Turning now to FIG. 2 with continued reference to FIG. 1, a framework application 200 operating on computing device 100 is illustrated. Framework application 200 is one of the application programs that reside on computing device 100. However, it will be understood that framework application 200 can alternatively or additionally be embodied as computer-executable instructions on one or more computers and/or in different variations than shown on FIG. 1. Alternatively or additionally, one or more parts of framework application 200 can be part of system memory 104, on other computers and/or applications 115, or other such variations as would occur to one in the computer software art.

Framework application 200 includes program logic 204, which is responsible for carrying out some or all of the techniques described herein. program logic 204 includes logic for allowing libraries in the framework to be identified (e.g. with annotations) as partial trust callers allowed to indicate they are allowed to be called from partially trusted code (e.g. by default) 206; logic for allowing libraries in the framework to be identified as partial trust callers enabled to indicate they could be called from partially trusted code, but not by default 208; logic for allowing a hosting application to have some control over how to handle the libraries that have been marked as partial trust callers allowed and/or partial trust callers enabled 210; logic for notifying the hosting application that a particular library has been loaded and/or accessed (e.g. by a callback, when it enters the table of loaded libraries, etc.) 212; logic for receiving a removal determination that the hosting application has removed or kept partial trust accessibility for a particular library that is marked as partial trust callers allowed and for making the library inaccessible or accessible to partially trusted code accordingly 214; logic for receiving an enablement determination that the host application has enabled or disabled partial trust accessibility for a particular library that is marked as partial trust callers enabled and for making the library accessible or inaccessible to partially trusted code accordingly 216; and other logic for operating the application 220. In one implementation, program logic 204 is operable to be called programmatically from another program, such as using a single call to a procedure in program logic 204.

Figure 3:
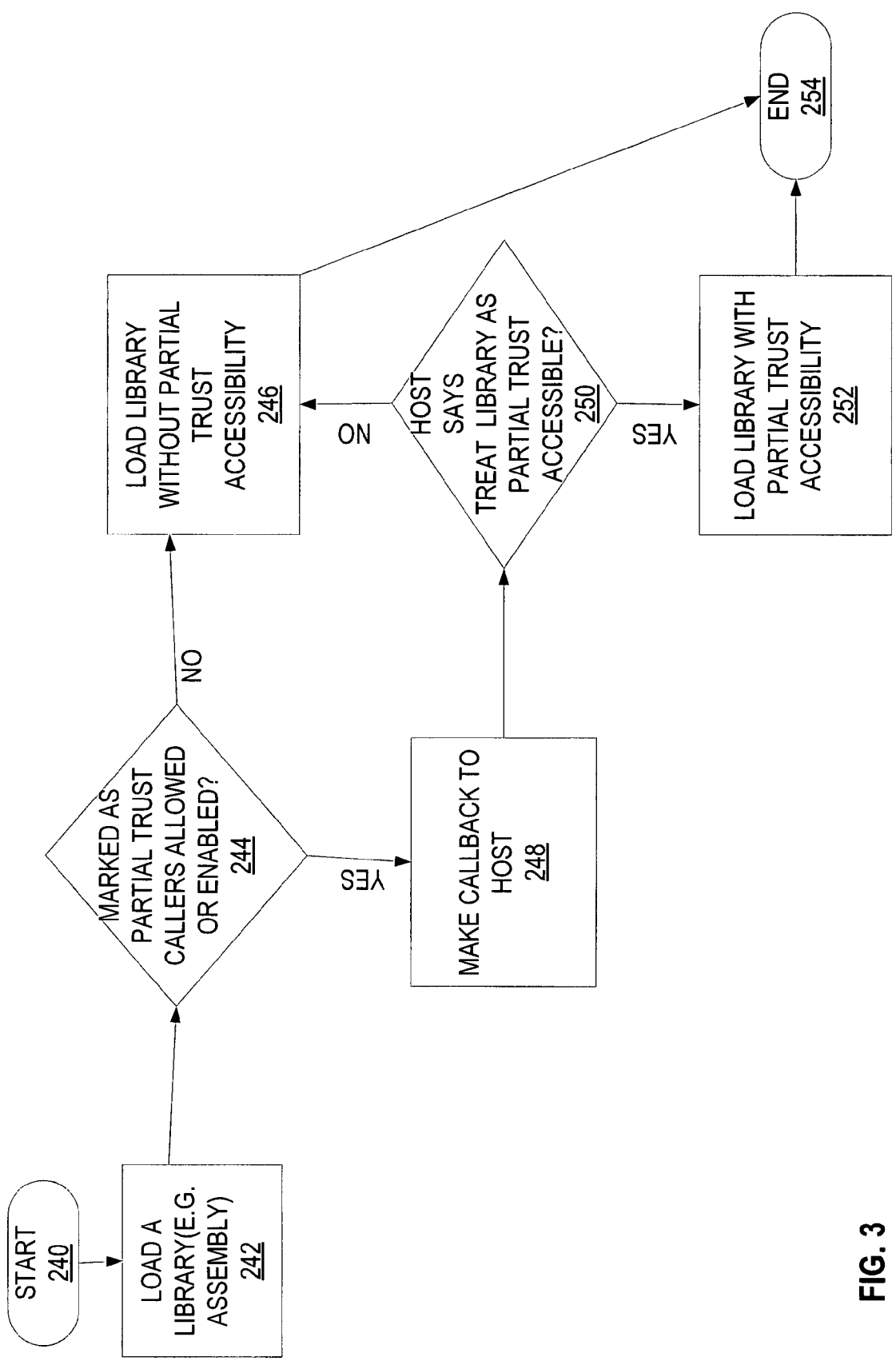
FIG. 3 is a high-level process flow diagram for one implementation of the system of FIG. 1.
Figure 4:
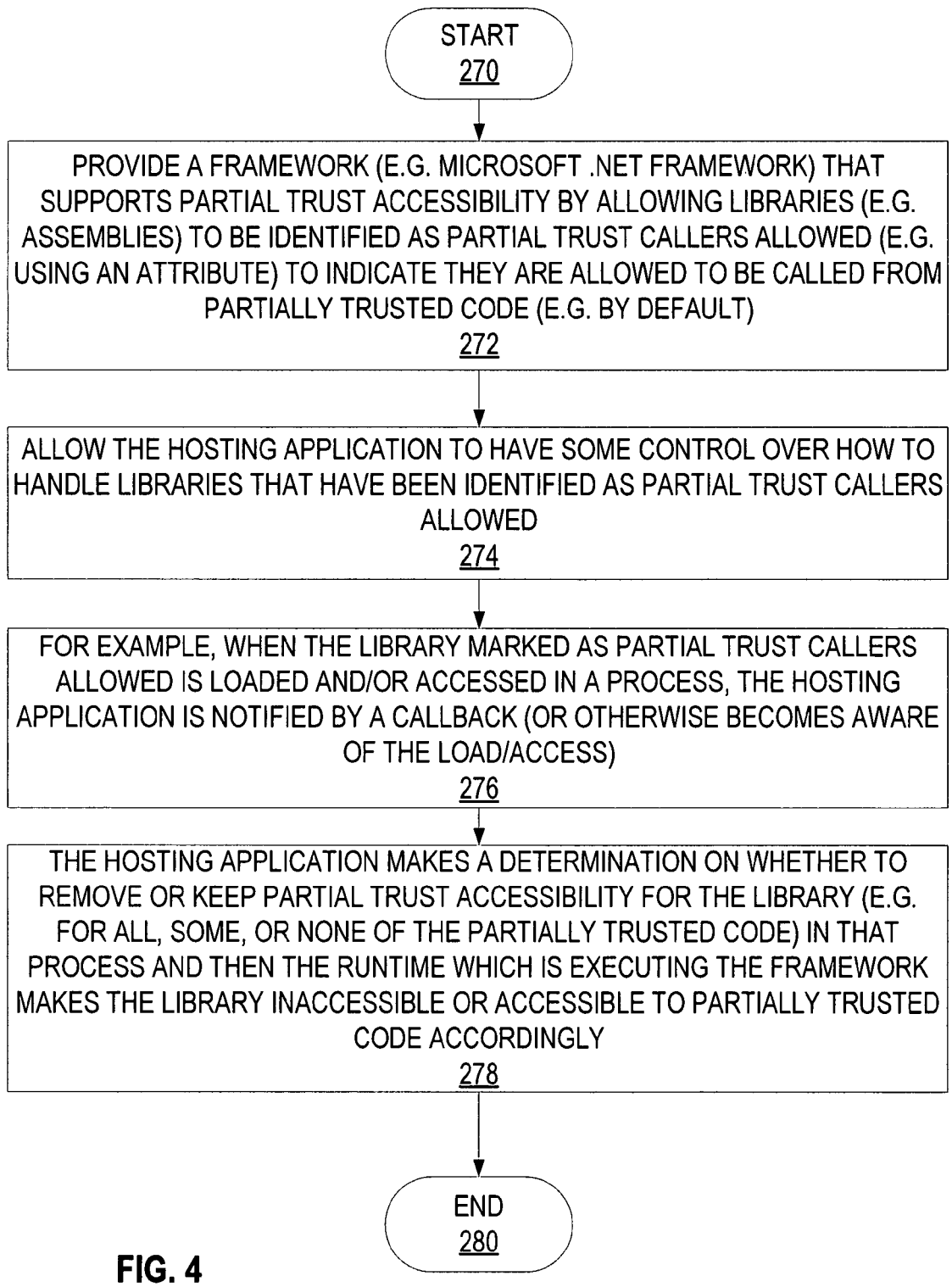
FIG. 4 is a process flow diagram for one implementation of the system of FIG. 1 illustrating the stages involved in allowing the host to have some control over libraries marked as partial trust callers allowed.
Figure 5:
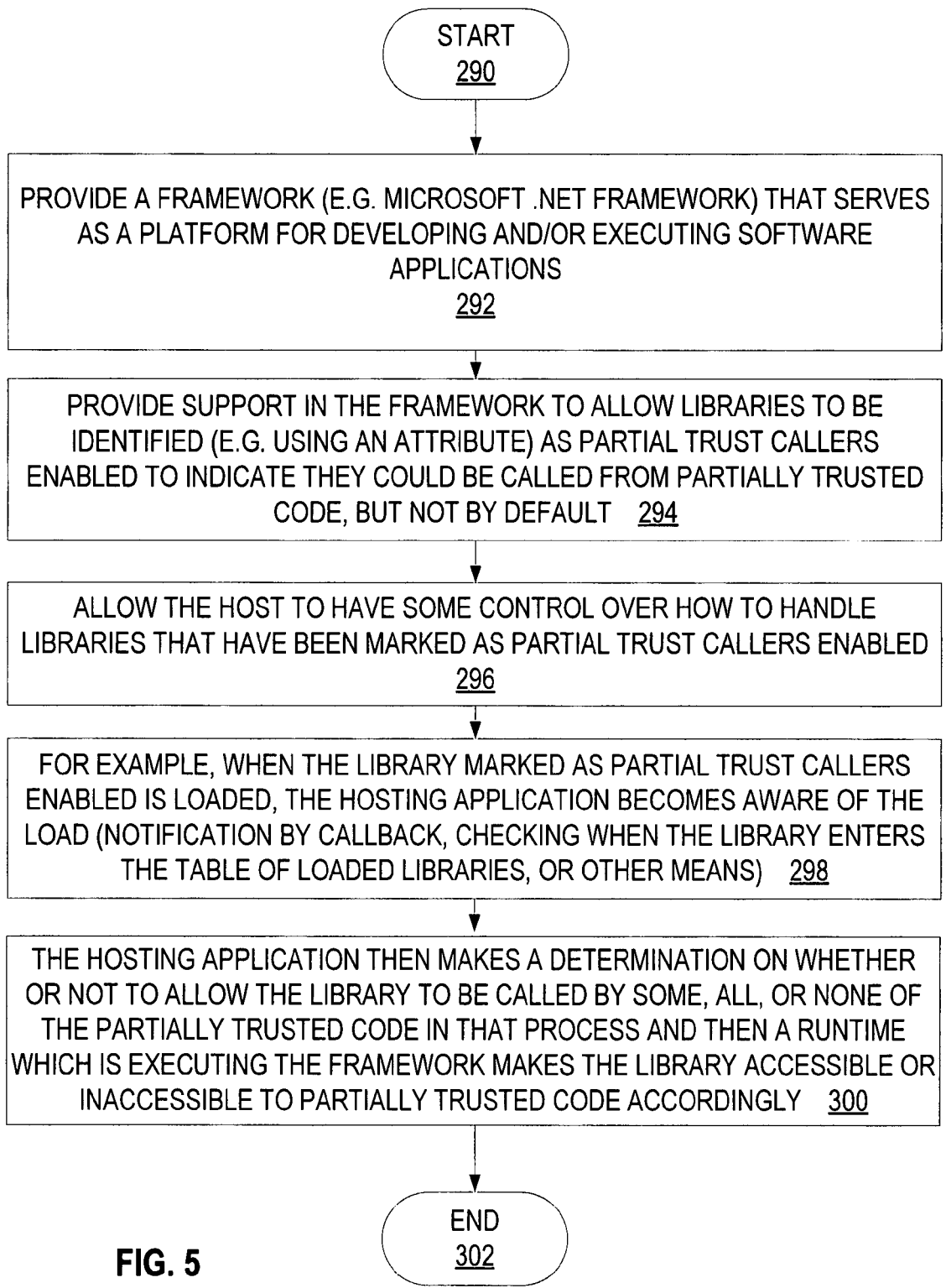
FIG. 5 is a process flow diagram for one implementation of the system of FIG. 1 illustrating the stages involved in allowing the host to have some control over libraries marked as partial trust callers enabled.

Turning now to FIGS. 3-5 with continued reference to FIGS. 1-2, the stages for implementing one or more implementations of framework application 200 are described in further detail. FIG. 3 is a high level process flow diagram for framework application 200. In one form, the process of FIG. 3 is at least partially implemented in the operating logic of computing device 100. The process begins at start point 240 with loading a library (e.g. an assembly) (242). If the library is not identified (or otherwise marked) as partial trust callers allowed or partial trust callers enabled (decision point 244), then the library is loaded without partial trust accessibility (stage 246), and the process ends at end point 254. If the library is identified (or otherwise marked) as partial trust callers allowed or partial trust callers enabled (decision point 244), then the runtime which is executing the framework makes a callback to the hosting application (stage 248) to get further instruction from the hosting application. If the hosting application indicates that the library should be treated as partial trust accessible (decision point 250), then the library is loaded with partial trust accessibility (stage 252) and the process ends at end point 254. If the hosting application indicates that the library should not be treated as partial trust accessible (decision point 250), then the library is loaded without partial trust accessibility (stage 246) and the process ends at end point 254.

FIG. 4 illustrates one implementation of the stages involved in allowing the host to have some control over libraries marked as partial trust callers allowed. In one form, the process of FIG. 4 is at least partially implemented in the operating logic of computing device 100. The process begins at start point 270 with providing a framework (e.g. MICROSOFT® .NET Framework) that supports partial trust accessibility by allowing libraries (e.g. assemblies) to be identified (or otherwise marked) as partial trust callers allowed (e.g. using an attribute) to indicate they are allowed to be called from partially trusted code (e.g. by default) (stage 272). A hosting application is allowed to have some control over how to handle libraries that have been identified as partial trust callers allowed (stage 274). For example, when a particular library marked as partial trust callers allowed is loaded and/or accessed in a process, the hosting application is notified by a callback (or otherwise becomes aware of the load/access) (stage 276). The term process as used herein is meant to include operating system processes, application domains, and/or any other separable unit of execution as defined by the framework or other operating environment. Some non-limiting examples of when the hosting application can be notified that the particular library has been loaded and/or accessed include when the particular library is loaded, when the particular library is loaded for the first time, and/or when the first call is made to the particular library from another library. The hosting application then makes a determination on whether to remove or keep partial trust accessibility for the library (e.g. for some, all, or none of the partially trusted code) in the process and then a runtime which is executing the framework makes the library inaccessible or accessible to partially trusted code accordingly (stage 278). The process ends at end point 280.

FIG. 5 illustrates one implementation of the stages involved in allowing the host to have some control over libraries marked as partial trust callers enabled. In one form, the process of FIG. 5 is at least partially implemented in the operating logic of computing device 100. The process begins at start point 290 with providing a framework (e.g. MICROSOFT® .NET Framework) that serves as a platform for developing and/or executing software applications (stage 292). The framework allows libraries to be identified or otherwise marked (e.g. using an attribute) as partial trust callers enabled to indicate they could be called from partially trusted code, but not by default (stage 294). The host is allowed to have some control over how to handle libraries that have been marked as partial trust callers enabled (stage 296). For example, when a particular library marked as partial trust callers enabled is loaded, the hosting application becomes aware of the load (by being notified through a callback, by checking when the library enters the table of loaded libraries, or by other means) (stage 298). The hosting application then makes a determination on whether or not to allow the library to be called by partially trusted code in that process and then a runtime which is executing the framework makes the library accessible or inaccessible to some, all, or none of the partially trusted code accordingly (stage 300). The process ends at end point 302.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for providing host control of partial trust accessibility comprising the steps of:
    providing a framework that allows one or more libraries to be identified as partial trust callers enabled to indicate that the one or more libraries could be called from partially trusted code, but not by default; and
    in response to a particular library of the one or more libraries identified as partial trust callers enabled being loaded in a process, notifying a hosting application so the hosting application can make a determination on whether to revoke partial trust accessibility rights that are granted based on the particular library being identified as partial trust callers enabled.

2. The method of claim 1, wherein the hosting application is notified by a callback that the particular library has been loaded.

3. The method of claim 1, wherein the hosting application becomes aware that the particular library has been loaded when the particular library enters a table of loaded libraries.

4. The method of claim 1, wherein the particular library is identified as partial trust callers enabled using an attribute.

5. The method of claim 1, wherein the particular library is an assembly.

6. The method of claim 1, wherein the framework is Microsoft .NET Framework.

7. The method of claim 1, wherein if the determination made by the hosting application is to allow the particular library to be called from partially trusted code, then the particular library is made accessible to the partially trusted code.

8. The method of claim 1, wherein if the determination made by the hosting application is to disallow the particular library from being called from partially trusted code, then the particular library is made inaccessible to the partially trusted code.

9. A computer-readable medium having computer-executable instructions for causing a computer to perform the steps recited in claim 1.

10. A method for providing host control of partial trust accessibility comprising the steps of:
    providing a framework that allows one or more libraries to be identified as partial trust callers allowed to indicate that the one or more libraries are allowed to be called from partially trusted code by default; and
    in response to a particular library of the one or more libraries identified as partial trust callers allowed being loaded in a process, notifying a hosting application by a callback so the hosting application can make a determination on whether to revoke partial trust accessibility rights that are granted based on the particular library being identified as partial trust callers allowed.

11. The method of claim 10, wherein the particular library is marked as partial trust callers allowed using an attribute.

12. The method of claim 10, wherein the particular library is an assembly.

13. The method of claim 10, wherein the framework is Microsoft .NET Framework.

14. The method of claim 10, wherein if the determination made by the hosting application is to remove partial trust accessibility for the particular library, then the particular library is made inaccessible to partially trusted code.

15. The method of claim 10, wherein if the determination made by the hosting application is to keep partial trust accessibility for the particular library, then the particular library is made accessible to partially trust code.

16. A computer-readable medium having computer-executable instructions for causing a computer to perform the steps recited in claim 10.

17. A computer storage medium having computer-executable instructions for causing a computer to perform steps comprising:
    allow a first one or more libraries in a framework to be identified as partial trust callers allowed to indicate the first one or more libraries are allowed to be called from partially trusted code by default;
    allow a second one or more libraries in the framework to be identified as partial trust callers enabled to indicate the second one or more libraries could be called from partially trusted code, but not by default;
    make a hosting application aware that a particular library has been loaded;
    if the particular library has been identified as partial trust callers allowed, then receive a removal determination from the hosting application on whether to revoke partial trust accessibility rights that are granted based on the particular library being identified as partial trust callers allowed, the determination being based on whether the particular library has been tested for execution in a reduced security zone where there is only partial trust; and
    if the particular library has been identified as partial trust callers enabled, then receive an enablement determination from the hosting application on whether to revoke partial trust accessibility rights that are granted based on the particular library being identified as partial trust callers enabled, the determination being based on whether the particular library has been tested for execution in a reduced security zone where there is only partial trust.

18. The computer storage medium of claim 17, wherein the particular library is made accessible or inaccessible to partially trusted code depending on the removal determination.

19. The computer storage medium of claim 17, wherein the particular library is made accessible or inaccessible to partially trusted code depending on the enablement determination.

20. The computer storage medium of claim 17, wherein the hosting application is notified by a callback that the particular library has been loaded.

* * * * *